(12) United States Patent
Carroll

(10) Patent No.: US 10,116,631 B2
(45) Date of Patent: *Oct. 30, 2018

(54) SYSTEMS AND METHODS FOR MANAGED DATA TRANSFER

(71) Applicant: Open Text SA ULC, Halifax (CA)

(72) Inventor: Jonathan Carroll, Beaconsfield (CA)

(73) Assignee: Open Text SA ULC, Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/878,691

(22) Filed: Jan. 24, 2018

(65) Prior Publication Data

US 2018/0152421 A1 May 31, 2018

Related U.S. Application Data

(63) Continuation of application No. 15/357,616, filed on Nov. 21, 2016, now Pat. No. 9,954,831, which is a continuation of application No. 14/627,817, filed on Feb. 20, 2015, now Pat. No. 9,537,834.

(60) Provisional application No. 61/952,809, filed on Mar. 13, 2014.

(51) Int. Cl.
*H04L 29/06* (2006.01)
*H04L 29/08* (2006.01)
*G06F 7/04* (2006.01)
*G06F 17/30* (2006.01)
*H04N 7/16* (2011.01)

(52) U.S. Cl.
CPC .......... *H04L 63/0428* (2013.01); *H04L 67/06* (2013.01); *H04L 67/10* (2013.01); *H04L 67/18* (2013.01); *H04L 63/029* (2013.01)

(58) Field of Classification Search
None
See application file for complete search history.

(56) References Cited

U.S. PATENT DOCUMENTS

| | | | | |
|---|---|---|---|---|
| 6,304,913 B1 * | 10/2001 | Rune | .................. | H04L 29/12066 709/241 |
| 6,332,164 B1 * | 12/2001 | Jain | .......................... | H04L 51/12 709/203 |
| 9,537,834 B2 | 1/2017 | Carroll | | |
| 9,954,831 B2 | 4/2018 | Carroll | | |
| 2002/0122427 A1 * | 9/2002 | Kamentsky | ............ | H04N 7/165 370/395.4 |
| 2003/0208693 A1 | 11/2003 | Yoshida | | |

(Continued)

FOREIGN PATENT DOCUMENTS

EP 2680541 1/2014

OTHER PUBLICATIONS

European Search Report issued for U.S. Appl. No. 15/158,928, dated Aug. 14, 2015, 8 pages.

(Continued)

*Primary Examiner* — Eric Chen
(74) *Attorney, Agent, or Firm* — Sprinkle IP Law Group

(57) ABSTRACT

Systems and methods are provided for managed file transfer. A managed file transfer server may receive a request from a sender to send a file (bulk data) to a recipient and may determine a location server that is closest to the location of the recipient. A server-to-server transfer can be automatically initiated to move the file to the location server that is closest to the location of the recipient.

21 Claims, 7 Drawing Sheets

(56) References Cited

U.S. PATENT DOCUMENTS

| | | | | |
|---|---|---|---|---|
| 2004/0083307 | A1* | 4/2004 | Uysal | H04L 67/16 |
| | | | | 709/246 |
| 2005/0144242 | A1* | 6/2005 | Marston | H04L 51/34 |
| | | | | 709/206 |
| 2006/0020667 | A1* | 1/2006 | Wang | H04L 67/18 |
| | | | | 709/206 |
| 2006/0168058 | A1* | 7/2006 | Midgley | G06Q 10/107 |
| | | | | 709/206 |
| 2008/0145050 | A1* | 6/2008 | Mayer | H04J 14/0227 |
| | | | | 398/49 |
| 2010/0011435 | A1* | 1/2010 | Wee | H04L 63/123 |
| | | | | 726/15 |
| 2010/0077037 | A1* | 3/2010 | Turakhia | H04L 29/1215 |
| | | | | 709/206 |
| 2012/0034906 | A1* | 2/2012 | Ueno | H04W 4/02 |
| | | | | 455/414.1 |
| 2013/0346522 | A1* | 12/2013 | Lennstrom | H04L 51/14 |
| | | | | 709/206 |
| 2015/0264019 | A1 | 9/2015 | Carroll | |
| 2017/0126633 | A1 | 5/2017 | Carroll | |

OTHER PUBLICATIONS

Office Action issued for U.S. Appl. No. 14/627,817, dated Apr. 27, 2016, 14 pages.
Notice of Allowance issued for U.S. Appl. No. 15/357,616, dated Dec. 12, 2017, 8 pages.
Office Action for European Patent Application No. 15158928.0, dated Jan. 2, 2018, 7 pages.
Office Action for European Patent Application No. 15158928.0, dated Jul. 18, 2018, 10 pages.
Verma, Selecting the Right Site in a CDN, Content Distribution Networks: An Engineering Approach, Jul. 23, 2001, John Wiley & Sons ProQuest Ebook Central, pp. 85-89.

* cited by examiner

SYSTEMS AND METHODS FOR MANAGED DATA TRANSFER

CROSS-REFERENCE TO RELATED APPLICATION(S)

This patent application is a continuation of, and claims a benefit of priority under 35 U.S.C. § 120 from, U.S. patent application Ser. No. 15/357,616, filed Nov. 21, 2016, now U.S. Pat. No. 9,954,831, entitled "SYSTEMS AND METHODS FOR MANAGED DATA TRANSFER," which is a continuation of, and claims a benefit of priority under 35 U.S.C. § 120 from, U.S. patent application Ser. No. 14/627,817, filed Feb. 20, 2015, now U.S. Pat. No. 9,537,834, entitled "SYSTEMS AND METHODS FOR MANAGED DATA TRANSFER," which is a conversion of, and claims a benefit of priority under 35 U.S.C. § 119 from, U.S. Provisional Application No. 61/952,809, filed Mar. 13, 2014, entitled "SYSTEMS AND METHODS FOR MANAGED DATA TRANSFER," which is hereby fully incorporated by reference herein.

TECHNICAL FIELD

This disclosure relates generally to data transfer. More particularly, this disclosure relates to systems and methods for managed file transfer. Even more particularly, this disclosure relates to systems, methods, and computer program products for hybrid on-premises/off-premises data transfer.

BACKGROUND OF THE RELATED ART

Today's enterprises regularly produce large files. These files need to be managed in accordance with various company policies and processes. In a highly collaborative industry, how to ensure the secure and timely exchange and/or sharing of large amounts of data around the world can be a very difficult challenge.

For example, using emails to exchange data as attachments thereto may seem to be a convenient solution. However, the default attachment size for most widely used corporate email servers is 10 MB. Even if the attachment size can be increased, a large file attachment (e.g., 10 MB or more) can slow down the speed of an email delivery, or even cause a timeout error. Furthermore, emails are prone to security attacks such as network snooping and lack adequate tracking/control of email traffic such as forwarding, making emails not an ideal solution.

Another solution involves using the file transfer protocol (FTP) to transfer large files such as 2 GB to 50 GB. However, FTP is insecure—usernames, passwords, and files are sent over FTP connections in plain text, making it susceptible to hacking. Additionally, it can be difficult to set up in an enterprise environment as it involves negotiating with enterprise firewalls and filtering active FTP connections on local client machines. Furthermore, the speed of delivery is not sufficient to meet the demands of today's enterprises as it may take six to eight hours to send a 20 GB file over a FTP connection.

In view of the drawbacks in existing solutions, there is room for innovations and improvements in the field of managed file transfer.

SUMMARY OF THE DISCLOSURE

Managed file transfer (MFT) refers to a solution for managing secure network data transfer from one computer to another over private and/or public networks, including the Internet. In some instances, such a solution is an enterprise class solution tailored to the needs and desires of an enterprise. Compared to ad-hoc file transfer solutions such as file transfer protocol (FTP), MFT provides a higher level of security and control over the payload as well as the transmission of large volumes of bulk data between entities.

MFT applications are available as either on-premises licensed software packages or off-premises software-as-a-service (SaaS). SaaS refers to a software delivery model where the software and associated data are hosted and accessible on a client device communicatively connected to a server machine in the cloud. In some instances, the software and associated data are hosted in the cloud and accessible by a user. The user may use a thin client and such a thin client may be integrated with a web browser executing on the client device. Cloud computing is a synonym for distributed computing over a network, a non-limiting example of which includes the Internet, and involves a number of computers connected through the network.

In some embodiments, a method for managed file transfer may include receiving by an enterprise server operating on one or more server machines a request from a sender to send a file to a recipient. The enterprise server may be configured for providing a plurality of server functions including a managed file transfer web service and a managed file transfer service. The method further comprises determining a location of the recipient, determining a location server that is closest to the location of the recipient, and automatically initiating a server-to-server transfer to move the file to the location server that is closest to the location of the recipient.

One embodiment comprises a system having a processor and non-transitory computer memory including instructions translatable by the processor to perform a method substantially as described herein. Another embodiment comprises a computer program product having at least one non-transitory computer-readable storage medium storing instructions translatable by at least one processor to perform a method substantially as described herein.

Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Figure 1:
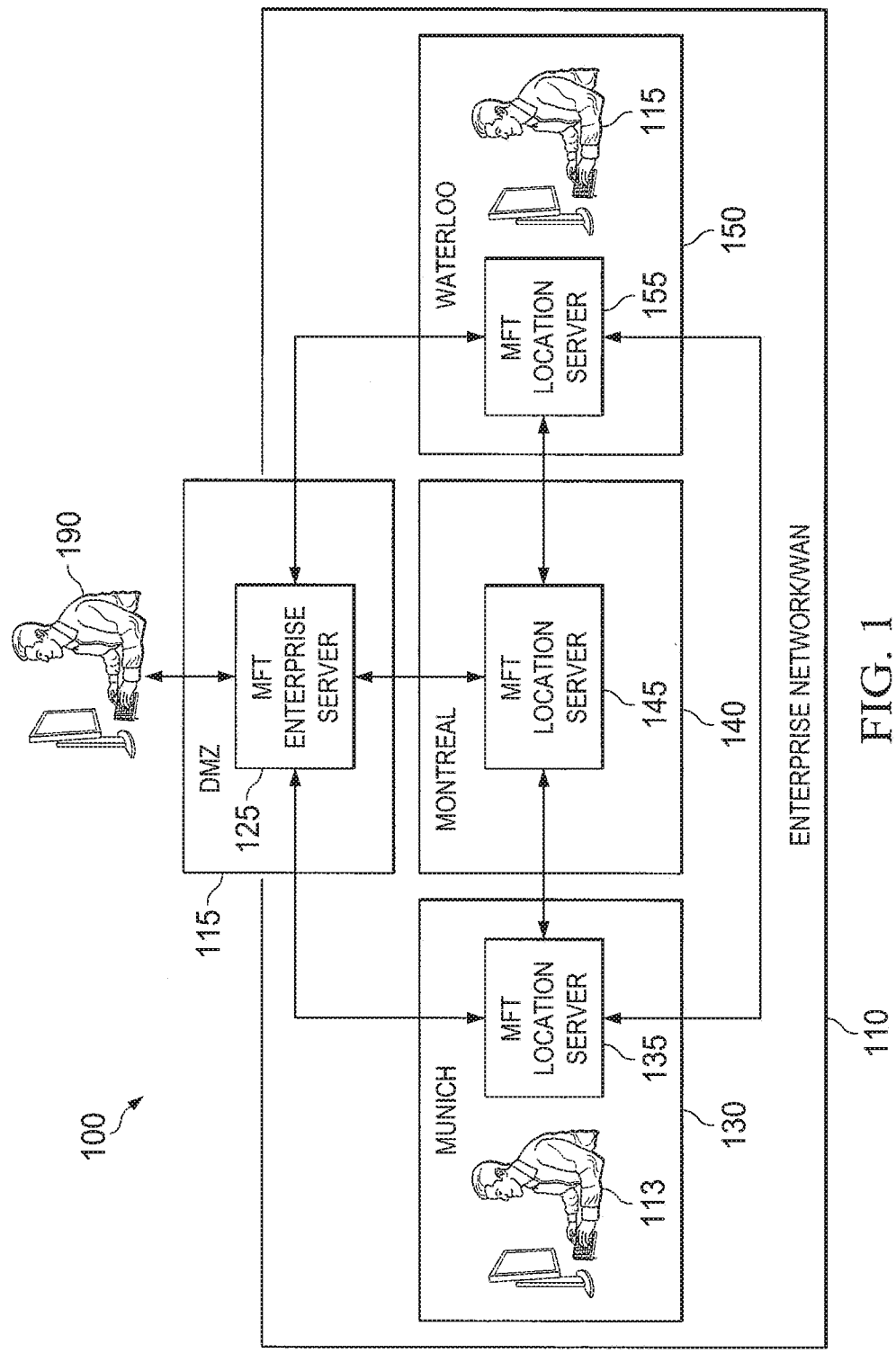
FIG. 1 depicts a diagrammatic representation of an example of an on-premises data transfer system and architecture.

FIG. 1 depicts a diagrammatic representation of an example of an on-premises data transfer system and architecture. In this example, system 100 includes managed file transfer (MFT) enterprise server 125. Several MFT location servers 135, 145, and 155 are communicatively connected to MFT enterprise server 125 and to each other via enterprise network 110 which, in one embodiment, can be a wide area network (WAN). An MFT enterprise server has a number of components including an MFT web service, an MFT transfer server, a file server, a database server, and an authentication server. The MFT web service provides the frontend services to users such as setting up and tracking transactions. The transfer server takes care of the server (host) side of a file transfer. Other components such as user authentication, database, etc. are not relevant for the purpose of this disclosure.

Each MFT location server resides at a geographic location and can be said to serve a particular group of individuals, non-limiting examples of which include those proximate to the geographic location and/or are served by a location server at an organization's office or those who are members of a particular group. For example, MFT location server 135 may reside at first location 130 (in this example, Munich, Germany), MFT location server 145 may reside at second location 140 (Montreal, Canada), and MFT location server 155 may reside at third location 150 (Waterloo, Canada). An MFT location server may have an MFT transfer server and a file server, but may not have an MFT web service, a database server, or an authentication server. In a typical MFT setup, in either an on-premises (see, e.g., FIG. 1) or cloud version (see, e.g., FIG. 2), MFT location servers are a subset of a main MFT enterprise server because they have no web services or databases. MFT location servers are servers that can perform file transfers and that can be quickly added.

As illustrated in FIG. 1, MFT location servers 135, 145, and 155 are all behind Demilitarized Zone (DMZ) 115 of enterprise network 110. In computer security, a DMZ refers to a physical or logical sub-network that contains and exposes an enterprise's external-facing services to a larger, untrusted network such as the Internet. MFT enterprise server 125 connects MFT location servers 135, 145, and 155 to the outside world (e.g., the Internet) via DMZ 115.

If user 115 who is an employee of the enterprise at location 150 wants to send a large file to user 190 who is outside of enterprise network 110, that transfer will take place through MFT enterprise server 125 at DMZ 115 and then go outside to the world. Meanwhile, if employee 115 at location 150 wants to send a large file to employee 113 at location 130, it will be MFT location server 155 at location 150 taking that file from employee 115 at location 150 and forwarding it automatically to MFT location server 135 at location 130. MFT location server 135 at location 130 then forwards the file to employee 113 at location 130. In this case, the file itself does not have to go through DMZ 115.

In the on-premises setup shown in FIG. 1, the MFT location servers are "on location" (on a company's enterprise network), under control of an enterprise such as an information technology (IT) department of a company. These MFT location servers have knowledge of a set of users and run on a network that the enterprise controls. Thus, the firewall is not an issue, since they are all within the purview and control of the IT department of the enterprise. However, because each MFT enterprise server is located inside the DMZ, setting up an on-premises MFT solution is a complex and complicated process. For example, the entity that offers the on-premises MFT solution often needs to involve network security and/or IT personnel from their enterprise customer to get the right port opened in the enterprise network's DMZ so the MFT enterprise server inside the DMZ can send data to and receive data from the outside world through the DMZ. On the other hand, the network security and/or IT personnel from the enterprise may not have the knowledge necessary to maintain the MFT enterprise server, which may result in repeated on-site visits to maintain/service the MFT enterprise server running inside the DMZ. Furthermore, some enterprises may not have the necessary resources to implement the on-premises MFT solution.

An off-premises MFT solution can avoid these issues by hosting MFT services in the cloud, thereby off-loading many of the technical setup, operational, and maintenance challenges to a hosting service. With the off-premises MFT solution, enterprises do not have to host an MFT enterprise server inside their DMZ and do not have to have any MFT location servers on their private network. They can avoid complicated setup in the DMZ, avoid getting network security and/or IT personnel involved in terms of getting the right port opened, avoid having to host transfers to outside people, etc.

Figure 2:
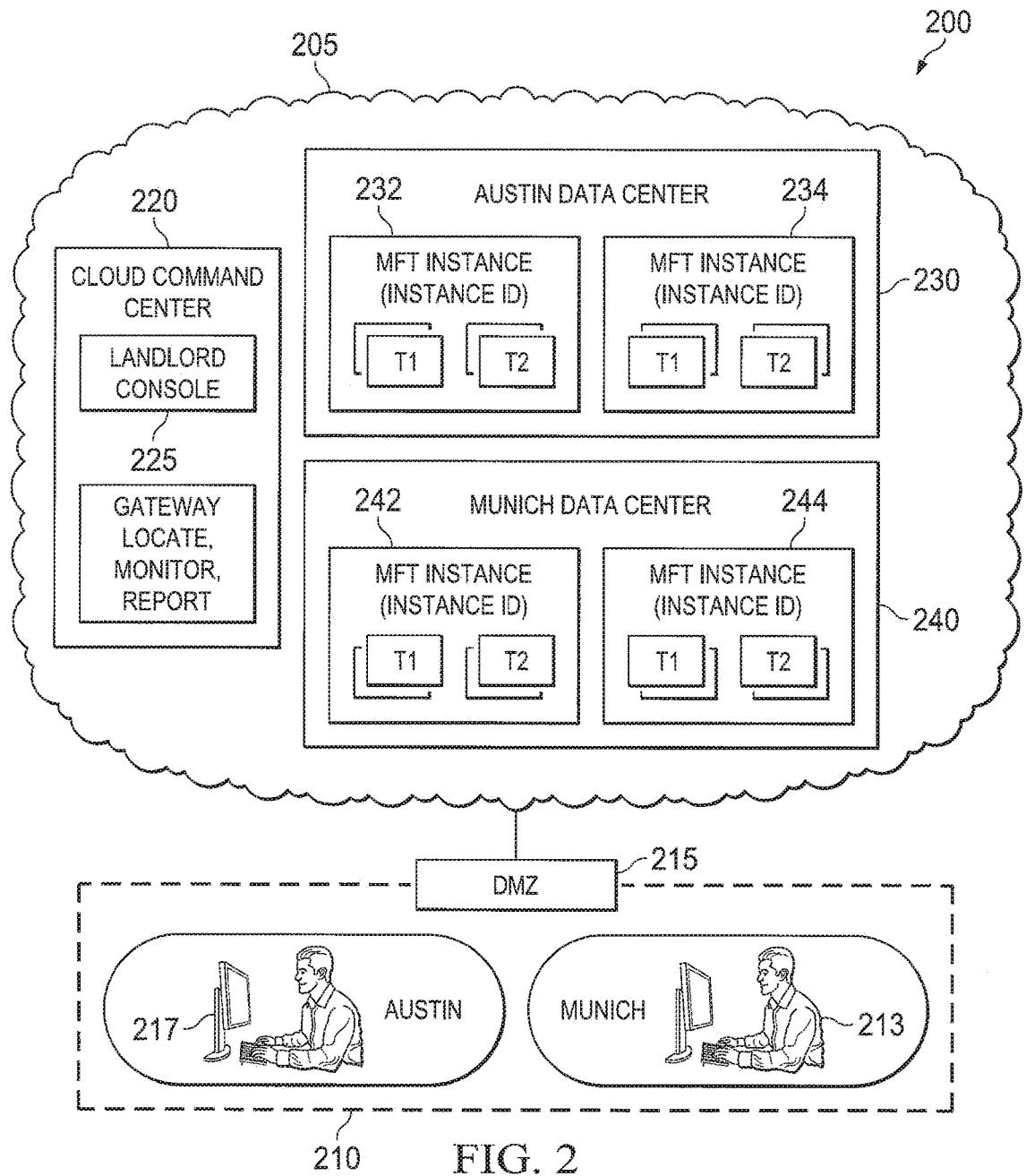
FIG. 2 depicts a diagrammatic representation of an example of an off-premises data transfer system and architecture.

FIG. 2 depicts a diagrammatic representation of an example of an off-premises data transfer system and architecture. In this example, system 200 includes cloud 205 providing data transfer services to employees 217, 213 in enterprise network 210 via DMZ 215. In physical terms, cloud 205 is made of command center 220 and data centers 230, 240. Command center 220 may reside in data center 230, data center 340, or another data center or server machine.

As those skilled in the art will appreciate, cloud 205 is configured for multitenancy. In cloud computing, multitenancy refers to a principle in software architecture in which a single instance of the software runs on a server to serve multiple client-organizations (tenants). In the example shown in FIG. 2, data center 230 has MFT instances 232, 234 running and data enter 240 has MFT instances 242, 244 running. Command center 220 may have landlord console 225 running to serve multiple client organizations (tenants). Each MFT instance can have one or more tenants and can be thought of as an MFT enterprise server described above. In the example shown in FIG. 2, each MFT instance has two tenants T1, T2.

These tenants are customers (e.g., businesses, companies, enterprises, corporations, organizations, etc.) who purchased or subscribed to MFT services from the cloud operator of cloud 205 and got on-boarded to an MFT server in cloud 205. Many of the tenants can be on-boarded to the same physical server. The physical make up and configuration of server machines in cloud 205 are transparent to the tenants.

In FIG. 2, the entity that owns enterprise network 210 may be tenant T1 or tenant T2. Because everything runs in cloud 205, no MFT components run on the entity's premises. All file transfers go through DMZ 215 and are performed by MFT servers sitting in cloud 205. If employee 217 wants to make a file transfer to employee 213, that transfer will begin by employee 217 sending a file from a computer on enterprise network 210 to cloud 205. Employee 213 will receive the file through cloud 205 (via the MFT instance hosting the entity's MFT service) and back to enterprise network 210 again.

This off-premises, cloud based MFT solution is advantageous for handling data transfers that take place between people who are not on-premises. However, as the above example illustrates, the off-premises MFT solution can lose some efficiency as compared to the on-premises MFT solution described above with reference to FIG. 1. For example, because there are no MFT location servers within an MFT tenant's private network, each file transfer must take place through the cloud, even if both the sender and the recipient are on the same MFT tenant's private network.

Embodiments provide a hybrid on-premises/off-premises MFT solution that can take advantage of the benefits and features of both the on-premises MFT solution and the off-premises MFT solution. In a hybrid on-premises/off-premises MFT solution, some MFT components are located on-premises and some are hosted in the cloud.

Figure 3:
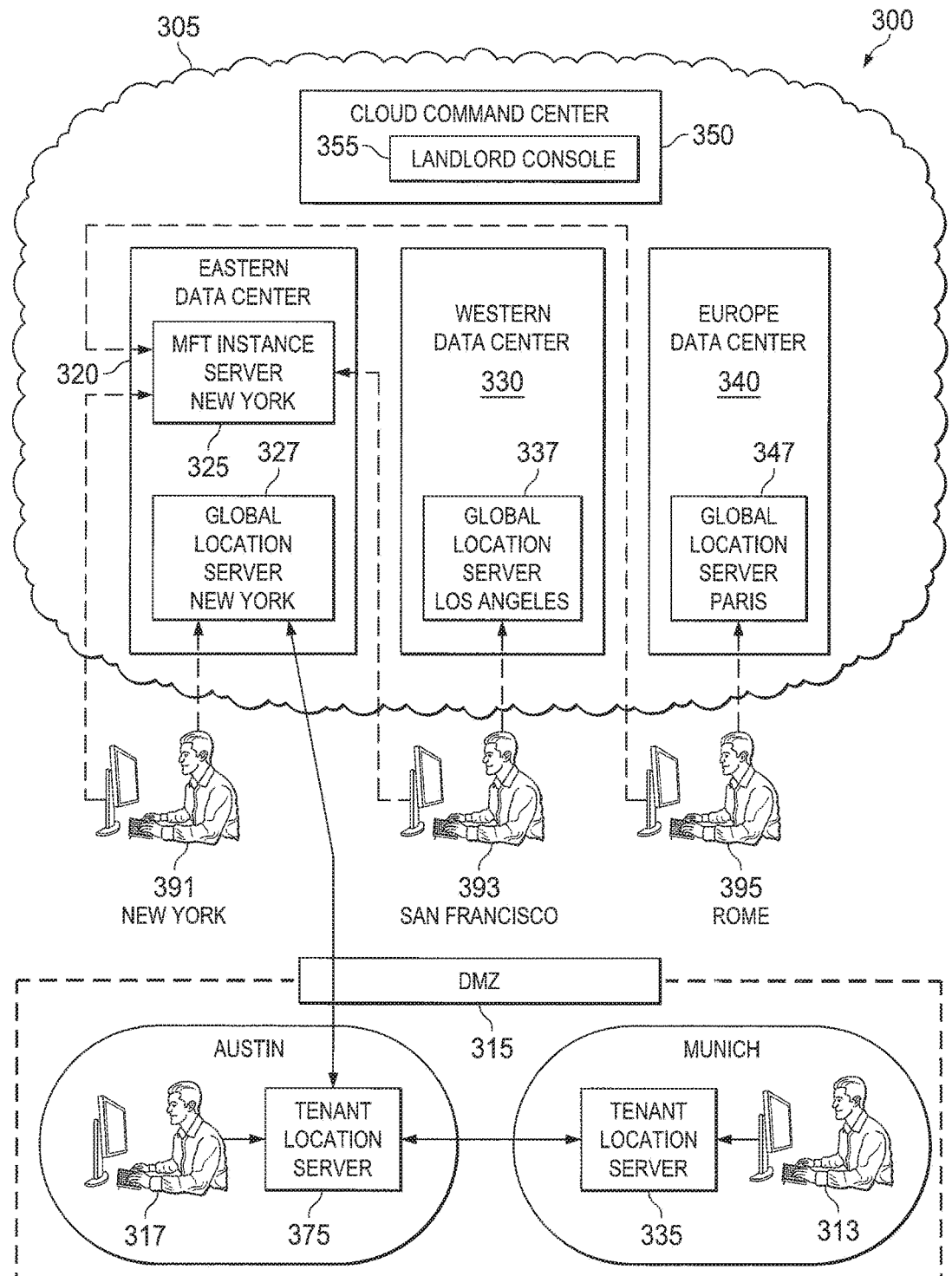
FIG. 3 depicts a diagrammatic representation of an example of a hybrid on-premises/off-premises data transfer system and architecture according to some embodiments.

FIG. 3 depicts a diagrammatic representation of an example of a hybrid on-premises/off-premises data transfer system and architecture according to some embodiments. In the example of FIG. 3, system 300 comprises data centers 320, 330, and 340 hosted in cloud 305. These data centers can be physically located remote from one another. As illustrated in FIG. 3, in some cases, data centers may be located across continents. Each data center may comprise a location server which is hosted in cloud 305 and thus off-premises of any customer's private network. These off-premises location servers may be referred to as global location servers. In this example, data center 320 may comprise global location server 327, data center 330 may comprise global location server 337, and data center 340 may comprise global location server 347. Eastern data center 320 may further comprise MFT instance 325 which, in this example, executes on a server machine located in New York, while global location server 327 is located in Chicago.

On-premises location servers installed inside a customer's private network may be referred to as tenant location servers. Such a private network may be a wide area network or a local area network (LAN). As illustrated in FIG. 3, tenant location servers 375, 335 may reside in enterprise network 310, behind DMZ 315. However, unlike the on-premises MFT solution illustrated in FIG. 1, there is not an MFT enterprise server inside DMZ 315.

For the purpose of illustration and not of limitation, FIG. 3 shows a single tenant's enterprise network 310. However, as those skilled in the art will appreciate, cloud 305 may serve multiple tenants. Further, each data center may separately run an MFT instance hosting multiple tenants, as described above with reference to FIG. 2. Cloud command center 350 may run landlord console 355 to serve these tenants.

Architecturally, a hybrid on-premises/off-premises solution for an individual tenant may comprise off-premises MFT components and on-premises MFT components. In some embodiments, a hybrid on-premises/off-premises solution for an individual tenant may comprise a single MFT instance and at least one global location server hosted in the cloud, and at least one tenant location server within a private network.

User 317 and user 313 may work for the entity that owns enterprise network 310. Suppose user 317 who is in Austin, Texas, U.S.A. wants to transfer a file to user 313 who is in Munich, Germany. In an example implementation that did not include on-premises tenant location servers 375, 335, the file would have to transfer from a computer of user 317 inside enterprise network 310, to an external off-premises location server on the Internet through DMZ 315 and stored in the cloud. User 313 would have to download the file from that cloud storage location which would tend to be closer to either user 317 or user 313. If user 313 downloaded the stored filed from a US-based data center closer to user 317 (such as data center 320 or 330), user 313 will likely experience longer transfer times because of the distance between the US-based data centers and Germany. The reverse would be true if the file were transferred to a European data center for storage (such as data center 340).

In contrast, in the hybrid topology, location servers are installed on-premises and may be referred to as tenant location servers, as described above. Operationally, when user 317 wants to send files to user 313, tenant location servers (375, 335) can be involved in transferring the files such that tenant location server 375 transfers files to tenant location server 335 closer to user 313. Such a file transfer takes place entirely within the enterprise network 310, without the need for off-premises location servers. In this way, more generally, the hybrid topology can be said to reduce file transfer time for on-premises users, at least once the file is transferred to a tenant location server servicing a user. This is further described below with reference to FIG.

Figure 4:
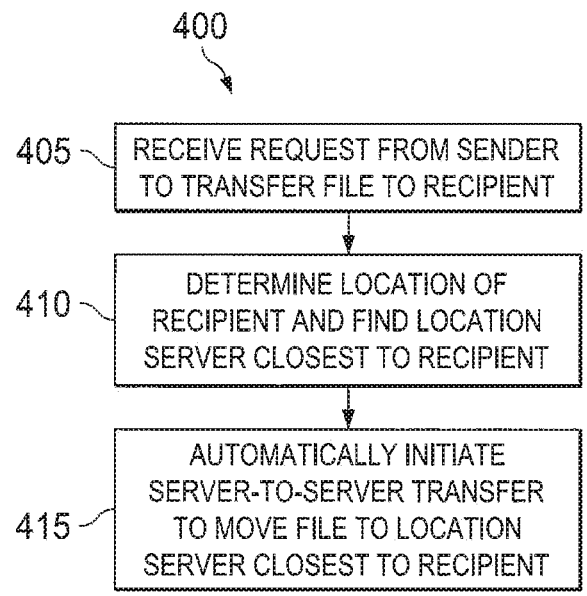
FIG. 4 depicts a flow diagram illustrating an example of a method for hybrid on-premises/off-premises data transfer according to some embodiments.

3 and also FIG. 4, which depicts a flow diagram illustrating an example of a method for hybrid on-premises/off-premises data transfer.

As a specific example of method 400, user 317 (sender) may send a request to cloud 305 to transfer a file to user 313 (recipient). In step 405, the request may be received by MFT instance 325 which runs an MFT web service for enterprise network 310. The file itself (bulk data) is uploaded from a computer of user 317 to tenant location server 375 inside enterprise network 310, out to the Internet through DMZ 315, to global location server 327 which is located in Chicago and which is the closest to user 317.

In step 410, MFT instance 325 may determine a location of user 313 and find a location server that is the closest to user 313. In step 415, MFT instance 325 may automatically initiate a server-to-server transfer to move the file to the location server that is the closest to user 313 and the location server then notifies user 313 that a file is waiting for him. The determination as to what constitutes the "closest" location server may be influenced by whether a pull operation or a push operation is to be used. For example, if a push operation is used, tenant location server 335 may be considered as the closest location server to user 313 and the file is "pushed" through DMZ 315 to tenant location server 335. In some cases, it may be easier to traverse a DMZ via a pull operation. If so, global location server 347 which is located in Paris, France, may be considered as the closest location server to user 313 who is in Munich, Germany. Thus, in this case, the file is moved to global location server 347; MFT instance 325 notifies tenant location server 335 of the requested transfer to user 313 and where the file is located (on global location server 347); and tenant location server 335 then notifies user 313 that a file is waiting for him.

In some embodiments, users and location servers can be located via network addresses or ranges of network addresses such as Internet Protocol (IP) addresses. In some embodiments, moving files closer to the recipients may significantly improve the performance of large file transfers. In some embodiments, moving files closer to the recipients may allow the transfers to leverage high speed LANs instead of WANs. In some embodiments, transfers among users within a private network can be incorporated in one or more rules. Examples of rules may include "if a server is defined for a user, that location server will be used for that user"; "if the IP address of a sender is defined, use a location server that corresponds to the sender"; and "if the IP address of a sender is not defined, use geo-location to find the nearest location server." These rules may be applied in order.

Users outside of an enterprise network may also utilize the hybrid on-premises/off-premises solution to send and receive large files to and from users inside of the enterprise network. For example, user 391 in Chicago, user 393 in San Francisco, and user 395 in Rome may be business partners, suppliers, service providers, etc. who communicate with users 313, 317 inside of enterprise network 310. Suppose user 395 wishes to send a large file to user 317 and sends a request to cloud 305. The file is uploaded to the location server that is the closest to user 395 which, in this case, is global location server 347 in data center 340. The request from user 395 is received by MFT instance 325 hosted in cloud 305. MFT instance 325 may authenticate user 395 and determine that user 395 is in Rome and that the file is stored on global location server 347 in data center 340. Since users outside of enterprise network 310 may not have defined IP addresses, MFT instance 325 may determine their locations using a geo-locating methodology. MFT instance 325 may further determine that the intended recipient, user 317, is located in Austin and that the file should be moved to global location server 327. MFT instance 325 may then initiate a server-to-server transfer operation to transfer the file from global location server 347 in data center 340, to global location server 337 in data center 330, to global location server 327 in data center 325. MFT instance 325 may further notify user 317 that a file is waiting to be downloaded. User 317 may authenticate with MFT instance 325 hosted in cloud 305 and download the file from global location server 327, via DMZ 315 and tenant location server 375 in enterprise network 310.

With further reference to FIG. 3, different file transfers may occur across a hybrid on-premises/off-premises MFT system 300 depending on the relative location of users (317, 313, 391, 393, 395), makeup of data centers 320/330/340, MFT server 325, location servers 375/335/327/337/347, and whether users and location servers are on-premises (i.e., on internal network 310) or off-premises (i.e., on external network 305). In file transfer from on-premises sender 317 to on-premises recipient 313, MFT instance server 325 determines the appropriate location server for sender 317 as tenant location server 375 and the appropriate location server for recipient 313 as tenant location server 335. As described herein above, MFT instance server 325 can use one or more approaches to determining the appropriate location servers for users.

In one embodiment, the appropriate location servers for users are predefined in a list which the MFT instance server 325 accesses. In another embodiment, a range of network addresses handled by each location server is maintained. The MFT instance server 325 determines whether a network address of a user's computer is within the range of network addresses of one of the location servers. If so, the location server is determined to be the location server for handling file transfers for the user. In yet another embodiment, location servers and users are geo-located. The location server closest to the user's location is determined to be the location server for handling file transfers for the user.

The MFT instance server 325 initiates a file transfer from user 317 to tenant location server 375 and a file transfer from tenant location server 375 to tenant location server 335. User 313 may be notified that the file is ready for download. As part of the file transfer process, MFT instance server 325 may require authentication by either one or both users 317, 313, for security purposes and/or to ensure proper application of rules and policies governing file transfers, information retention, and data properties.

Hybrid on-premises/off-premises MFT system 300 handles another type of file transfer in which on-premises sender user 317 transfers a file to an off-premises recipient user 391. Here, using one of the aforementioned approaches for determining appropriate location servers, the MFT instance server 325 initiates a file transfer from user 317 to tenant location server 375. MFT instance server 325 then initiates a transfer from tenant location server 375 to global location server 327 assigned to service off-premises user 391. User 391 may then download the file from global location server 327.

Hybrid on-premises/off-premises MFT system 300 handles yet another type of file transfer in which on-premises sender user 317 transfers a file to an off-premises recipient user 395. Here, the MFT instance server 325 initiates a file transfer from user 317 to tenant location server 375. In this instance, MFT instance server 325 determines that no direct connection exists between tenant location server 375 and global location server 347 assigned to user 395 in Rome. However, MFT instance server 325 determines that global location sever 327 can serve as an intermediary between tenant location server 375 and global location server 347. MFT instance server 325 then initiates a transfer from tenant location server 375 to global location server 327 and then from server 327 to global location server 347. User 395 may then download the file from global location server 347.

In another embodiment, hybrid on-premises/off-premises MFT system 300 handles another type of file transfer in which off-premises sender user 391 transfers a file to off-premises recipient user 393. Here, the MFT instance server 325 may use the geo-location approach to assign user 391 to global location server 327 and may assign user 393 to global location server 337 based on the fact that the user's network address is within the range of network address's handled by server 337. The MFT instance server 325 transfers the file from the computer of user 391 to server 347 and then from server 347 to server 337.

In a further embodiment, hybrid on-premises/off-premises MFT system 300 handles another type of file transfer between an off-premises sender user 391 and on-premises recipient user 317. Here, for security reasons, it may not be desirable to transfer the file from an off-premises public network 305 to an on-premises private network 310. For example, hackers may be able to infiltrate private network 310 and pass on viruses to the organization's network if such a file transfer were allowed without further precautions and/or mechanisms to thwart and prevent such attacks. To solve this problem, the file is pulled from the public network 305 to private network 310. Here, the MFT instance server initiates the file transfer to global location server 327, but does not initiate the transfer to on-premises tenant location server 375. Instead, tenant location server 375 requests the file from global location server 327. In some embodiments, the MFT instance server may send a request to tenant location server 375 to download the file. In response, tenant location server 375 initiates a request to download the file from global location server 327. In further embodiments, tenant location server 375 may require user 317 to authenticate with transfer system 300 as an added security precaution.

Figure 5:
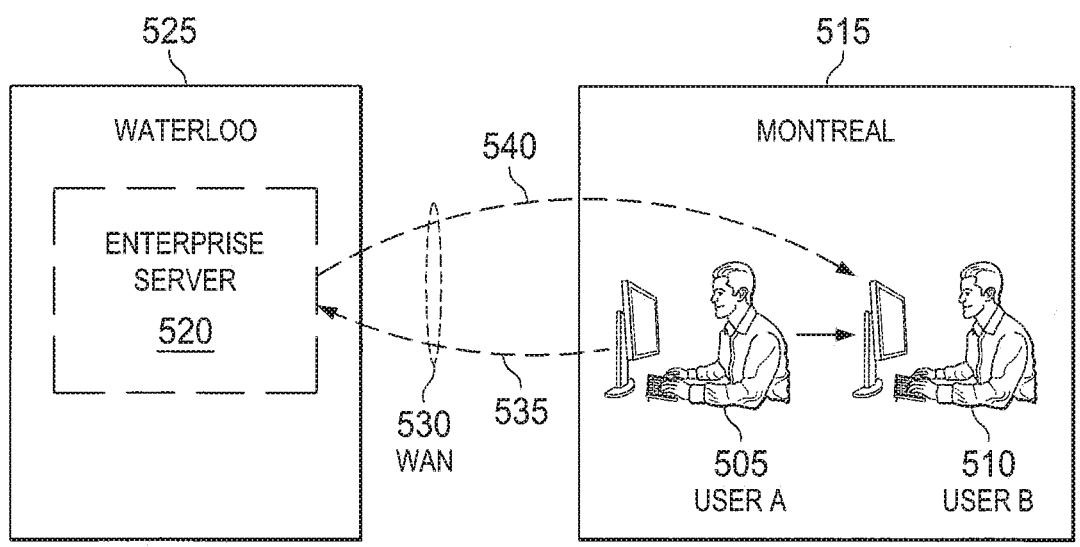
FIG. 5 depicts a diagrammatic representation of a data processing system for implementing hybrid on-premises/off-premises data transfer according to some embodiments.

FIG. 5 depicts a diagrammatic representation of an example of single server MFT according to some embodiments. As shown in FIG. 5, user A 505 may wish to transfer a file to user B 510 where both of them are located in same locale 515 such as a city, an office, or the like. Enterprise server 520 with an MFT capability may be located in another locale 525 and communicatively connected to user A 505 and user B 510 via WAN 530. Although user A 505 and user B 510 are in same locale 515, transferring a file between them involves sending the file over WAN 530 from one locale to another and then back. Specifically, user A 505 is first authenticated by enterprise server 520 via WAN connection 535. Once authenticated, the file is transferred from a client device associated with user A 505 in locale 515 to enterprise server 520 in locale 525 over WAN connection 535. Enterprise server 520 in locale 525 then sends the file to user B 510 in locale 515 via WAN connection 540.

Figure 6:
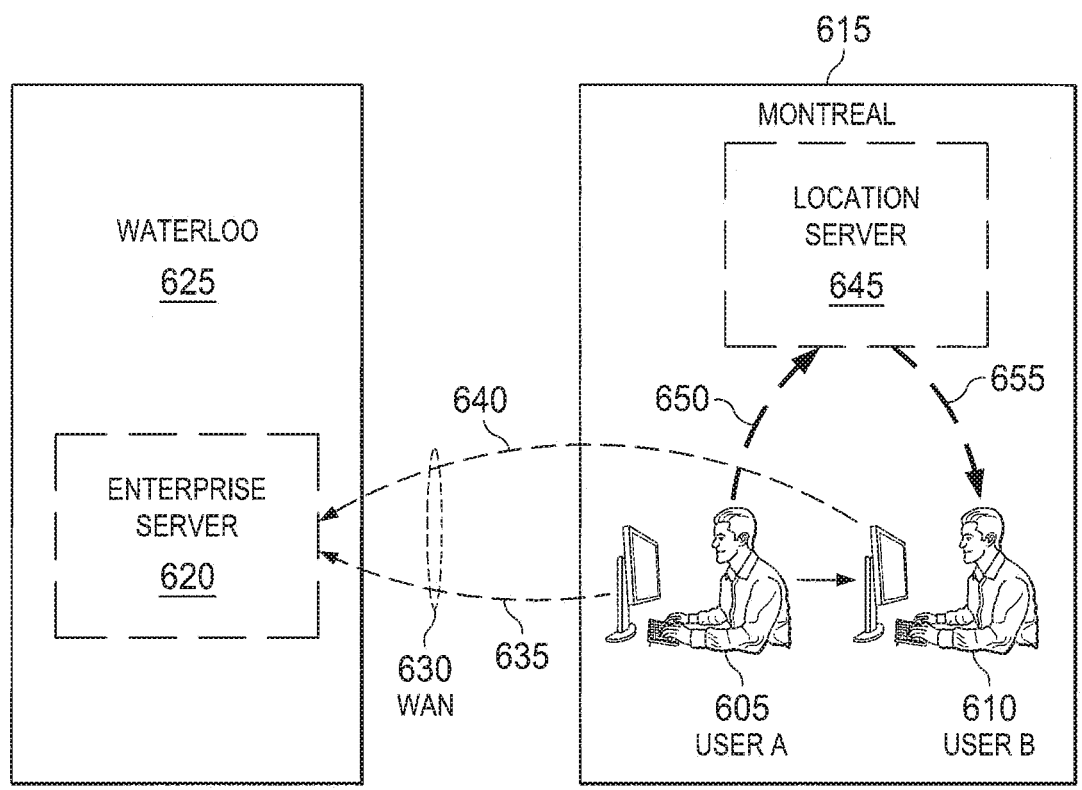
FIG. 6 depicts a diagrammatic representation of an example of managed file transfer (MFT) using multiple server-local exchanges according to some embodiments.

FIG. 6 depicts a diagrammatic representation of an example of multi-server MFT according to some embodiments. As shown in FIG. 6, user A 605 may wish to transfer a file to user B 610 where both of them are located in local 615. The file may be transferred via a web service offered by enterprise server 620 in locale 625. Unlike the example described above with reference to FIG. 6, the file is not sent to enterprise server 620 over WAN 630. Rather, location server 645 in locale 615 can handle the file transfer locally.

Specifically, authentication information associated with user A 605 is sent to enterprise server 620 via WAN connection 635. Once authenticated, the file is transferred from a client device associated with user A 605 in locale 615 to location server 645 in locale 615 over LAN connection 650. User B 610 can authenticate with enterprise server 620 over WAN connection 640 and, once authenticated, download the file from location server 645 over LAN connection 655.

Figure 7:
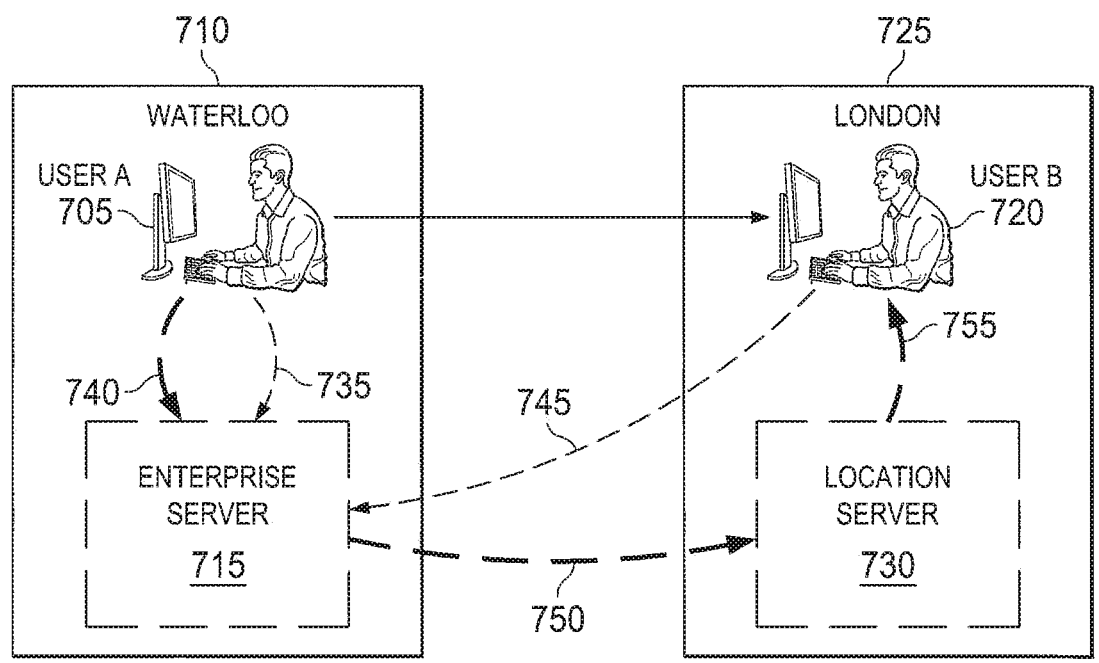
FIG. 7 depicts a diagrammatic representation of an example of MFT using multiple server-international exchanges according to some embodiments.

FIG. 7 depicts a diagrammatic representation of another example of multi-server MFT according to some embodiments. As shown in FIG. 7, user A 705 in first locale 710 may wish to transfer a file to user B 720 in second locale 725. In this example, enterprise server 715 and user A 705 are in same locale 710 and location server 730 and user B are in same locale 725. First, user A 705 is authenticated by enterprise server 715 over LAN connection 735. Once authenticated, the file is transferred from a client device associated with user A 705 to enterprise server 715 via LAN connection 740. Enterprise server 715 then transfers the file to location server 730 via server-to-server connection 750. User B 720 can authenticate with enterprise server 715 over WAN connection 745 and, once authenticated, download the file from location server 730 over LAN connection 755.

Figure 8:
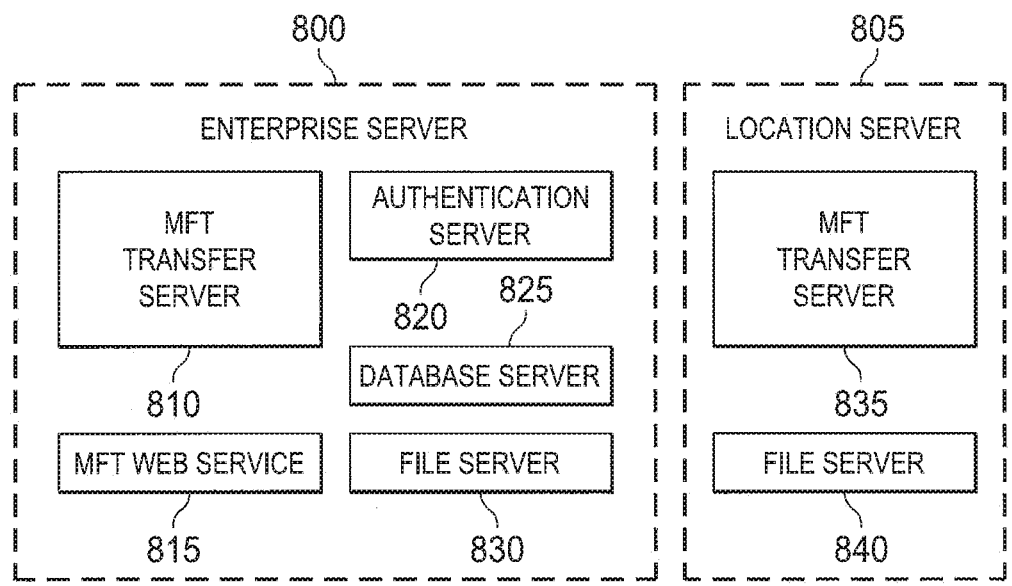
FIG. 8 depicts a diagrammatic representation of an example of an enterprise server and a location server according to some embodiments.

FIG. 8 depicts a diagrammatic representation of an example of enterprise server 800 and location server 805 according to some embodiments. In this example, enterprise server 800 may include MFT transfer server 810, MFT web service 815, authentication server 820, database server 825, and file server 830, and location server 805 may include MFT transfer server 835 and file server 840. MFT transfer server 810 can be configured for managing and handling file transfers. File server 830 can be configured for processing files to be transferred and performing the actual file transfers. MFT transfer server 835 may operate in the same or similar manner as MFT transfer server 810 and file server 840 may operate in the same or similar manner as file server 830.

When a file transfer is complete, MFT transfer server 810 saves the file to a file system. MFT web service 815 can be configured for providing MFT as a web service and can communicate user credentials to authentication server 820. Authentication server 820 authenticates the user credentials which may, in one embodiment, be stored in database server 825.

Database server 825 can store information related to file transfers between enterprise server 800 and location server 805. For example, if a user were to send a set of files to another user. A file transfer containing the set of files may be referred to as a transaction and information about this transaction can be stored in database server 825. The stored information may include designated recipient(s), the creator or sender, and metadata about the set of files. This type of information stored in database server 825 can be useful for audit purposes. That is, any time a user downloads a file or sends a file or accesses a file, the related information may be tracked and stored in an audit database for subsequent auditing. In some embodiments, stored transactions may have a certain retention time and may automatically expire after a certain amount of time. In some embodiments, a sender can recall a file that he sent, and that action may cause the transaction to expire immediately and not be stored in database server 825.

In some embodiments, MFT transfer server 810 may query database server 825. For example, MFT transfer server 810 may once a day prepare and send a query to database server 825 to delete any files that have expired in the last 24 hours. This may be done by obtaining a list of all files that expired in the last 24 hours and examining the list to determine if it has a record of any of those files.

Figure 9:
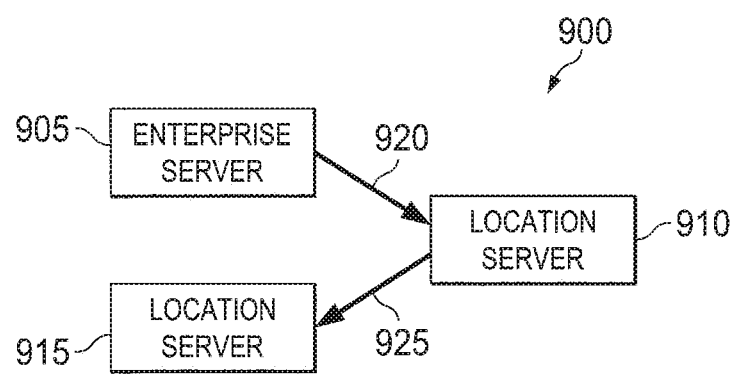
FIG. 9 depicts a diagrammatic representation of an example of on-premises server-to-server transfer according to some embodiments.

FIG. 9 depicts a diagrammatic representation of an example of on-premises server-to-server transfer according to some embodiments. As illustrated in FIG. 9, data transfer can be done entirely via on-premises servers. In this example, on-premises system 900 may include enterprise server 905, location server 910, and location server 915. Location server 910 and location server 915 may respectively reside in a first locale (e.g., Munich) and a second locale (e.g., Chicago). Enterprise server 905 may receive from a first user in Munich a request to send a file stored on location server 910 to a second user in Chicago. Responsive to this user request, enterprise server 905 may send request 920 to location server 910. Request 920 may include an instruction for location server 910 to send the particular file to location server 915. File 925 is then directly transferred from location 910 to location server 915. In this example, enterprise server 905 only needs to send a relatively very small message to location server 910 and no large file is exchanged between enterprise server 905 and location server 910. Because File 925 can be considered "pushed" from location server 910 to location server 915, this type of MFT may be referred to as a push MFT.

Figure 10:
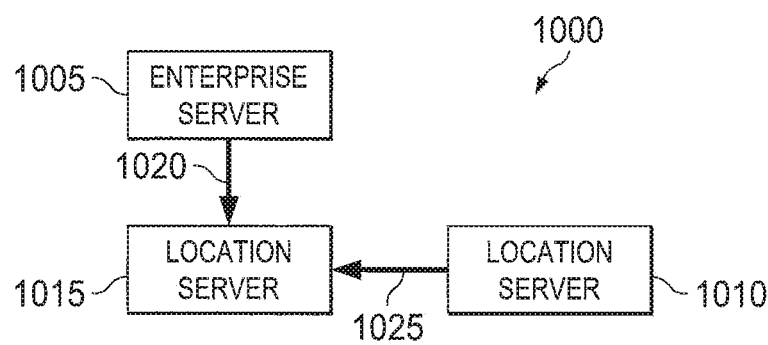
FIG. 10 depicts a diagrammatic representation of an example of hybrid server-to-server transfer according to some embodiments.

FIG. 10 depicts a diagrammatic representation of an example of hybrid server-to-server transfer according to some embodiments. Hybrid server system comprises enterprise server 1005, on-premises location server 1015, and off-premises location server 1010. Unlike on-premises location server 1015, off-premises location server 1010 may operate outside of a company's firewall.

Enterprise server 1005 may receive from a first user (e.g., a partner or contractor of the company operating enterprise server 1005 and on-premises location server 1015) a request to transfer a file from off-premises location server 1010 to a second user (e.g., an employee of the company). Responsive to this user request, enterprise server 1005 may send request 1020 to on-premises location server 1015. Request 920 may include an instruction for location server 1015 to retrieve the particular file from off-premises location server 1010. Instead of having off-premises location server 1010 trying to push file 1025 through the firewall to on-premises location server 1015, on-premises location server 1015 can initiate the download of file 1025 and file 1025 is pulled from off-premises location server 1010 by on-premises location server 1015. This type of MFT may be referred to as a pull MFT. In this example, enterprise server 1005 only needs to send a relatively very small message to on-premises location server 1015 and no large file is exchanged between enterprise server 1005 and location server 1015.

Figure 11:
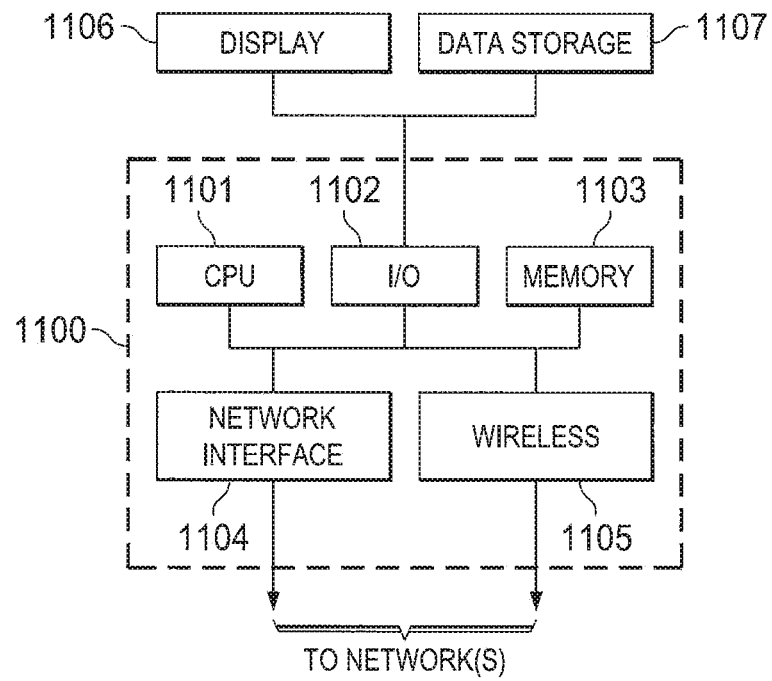
FIG. 11 depicts a diagrammatic representation of a data processing system for implementing hybrid on-premises/off-premises data transfer according to some embodiments.

FIG. 11 depicts a diagrammatic representation of a data processing system for implementing hybrid on-premises/off-premises data transfer according to some embodiments. As shown in FIG. 11, data processing system 1100 may include one or more central processing units (CPU) or processors 1101 coupled to one or more user input/output (I/O) devices 1102 and memory devices 1103. Examples of I/O devices 1102 may include, but are not limited to, keyboards, displays, monitors, touch screens, printers, electronic pointing devices such as mice, trackballs, styluses, touch pads, or the like. Examples of memory devices 1103 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 1100 can be coupled to display 1106, information device 1107 and various peripheral devices (not shown), such as printers, plotters, speakers, etc. through I/O devices 1102. Data processing system 1100 may also be coupled to external computers or other devices through network interface 1104, wireless transceiver 1105, or other means that is coupled to a network such as a local area network (LAN), WAN, or the Internet. The enterprise servers, location servers, global location servers, tenant location servers, and various client devices described above may each be a data processing system that is the same as or similar to data processing system 1100. Additionally, functional components necessary to implement embodiments of hybrid on-premises/off-premises data transfer disclosed herein may reside on one or more data processing systems that are the same as or similar to data processing system 1100.

Those skilled in the relevant art will appreciate that the invention can be implemented or practiced with other computer system configurations, including without limitation multi-processor systems, network devices, mini-computers, mainframe computers, data processors, and the like. The invention can be embodied in a special purpose computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a CPU, at least one ROM, at least one RAM, at least one HD, and one or more I/O device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be embodied on distributed, or networked systems which may include hardware components and/or circuits. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include RAMs, ROMs, HDs, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A system for managed file transfer, comprising:
    a server machine operating a managed file transfer server connected, over a network, to a plurality of location servers, the server machine operating the managed file transfer server to:
    receive a request to send data to a recipient;
    determine a location of the recipient;
    determine a location server of the plurality of location servers that is closest to the location of the recipient; and
    automatically initiate a server-to-server transfer to move the data to the location server that is closest to the location of the recipient;
    wherein the request is received from a first location server operating at a first location, the location server that is closest to the location of the recipient is a second location server operating at a second location, and the server-to-server transfer is automatically initiated by the managed file transfer server to move the data from the first location server to the second location server, each of the first location server and the second location server being a subset of the managed file transfer server, the subset comprising a transfer server and a file server.

2. The system of claim 1, wherein the location server that is closest to the location is geographically closest to the location.

3. The system of claim 1, wherein the server-to-server transfer is automatically initiated by the managed file transfer server to move the data from the first location server to the second location server via at least one intermediate server.

4. The system of claim 1, wherein the first location server is operating on the server machine as the managed file transfer server.

5. The system of claim 1, wherein the managed file transfer server is hosted on the server machine in a cloud.

6. The system of claim 5, wherein the second location server is hosted on the server machine in the cloud.

7. The system of claim 5, wherein the first location server and the second location server are on a private network operating outside of the cloud.

8. A managed file transfer method, comprising:
    receiving, by a managed file transfer server, a request from a sender to send data to a recipient, the managed file transfer server operating on a server machine connected over a network to a plurality of location servers;
    the managed file transfer server determining a location of the recipient;
    the managed file transfer server determining a location server of the plurality of location servers that is closest to the location of the recipient; and
    the managed file transfer server automatically initiating a server-to-server transfer to move the data to the location server that is closest to the location of the recipient, wherein the request is received from a first location server operating at a first location, the location server that is closest to the location of the recipient is a second location server operating at a second location, and the server-to-server transfer is automatically initiated by the managed file transfer server to move the data from the first location server to the second location server, each of the first location server and the second location server being a subset of the managed file transfer server, the subset comprising a transfer server and a file server.

9. The method of claim 8, wherein the location server that is closest to the location is geographically closest to the location.

10. The method of claim 8, wherein the server-to-server transfer is automatically initiated by the managed file transfer server to move the data from the first location server to the second location server via at least one intermediate server.

11. The method of claim 8, wherein the first location server is operating on the server machine as the managed file transfer server.

12. The method of claim 8, wherein the managed file transfer server is hosted on the server machine in a cloud.

13. The method of claim 12, wherein the second location server is hosted on the server machine in the cloud.

14. The method of claim 12, wherein the first location server and the second location server are on a private network operating outside of the cloud.

15. A non-transitory computer readable medium comprising instructions for a hardware processor of a managed file transfer server to perform:
    receiving a request from a sender to send data to a recipient, the managed file transfer server operating on a server machine connected over a network to a plurality of location servers;
    determining a location of the recipient;
    determining a location server of the plurality of location servers that is closest to the location of the recipient; and
    automatically initiating a server-to-server transfer to move the data to the location server that is closest to the location of the recipient, wherein the request is received from a first location server operating at a first location, the location server that is closest to the location of the recipient is a second location server operating at a second location, and the server-to-server transfer is automatically initiated by the managed file transfer server to move the data from the first location server to the second location server, each of the first location server and the second location server being a subset of the managed file transfer server, the subset comprising a transfer server and a file server.

16. The non-transitory computer readable medium of claim 15, wherein the location server that is closest to the location is geographically closest to the location.

17. The non-transitory computer readable medium of claim 15, wherein the server-to-server transfer is automatically initiated by the managed file transfer server to move the data from the first location server to the second location server via at least one intermediate server.

18. The non-transitory computer readable medium of claim 15, wherein the first location server is operating on the server machine as the managed file transfer server.

19. The non-transitory computer readable medium of claim 15, wherein the managed file transfer server is hosted on the server machine in a cloud.

20. The non-transitory computer readable medium of claim 19, wherein the second location server is hosted on the server machine in the cloud.

21. The non-transitory computer readable medium of claim 19, wherein the first location server and the second location server are on a private network operating outside of the cloud.

* * * * *